(12) United States Patent
Hamada et al.

(10) Patent No.: US 8,917,977 B2
(45) Date of Patent: *Dec. 23, 2014

(54) INFORMATION PROCESSING APPARATUS, INFORMATION PROCESSING METHOD, AND PROGRAM

(75) Inventors: Toshiya Hamada, Saitama (JP); Kenichiro Aridome, Kanagawa (JP)

(73) Assignee: Sony Corporation, Tokyo (JP)

( * ) Notice: Subject to any disclaimer, the term of this patent is extended or adjusted under 35 U.S.C. 154(b) by 308 days.

This patent is subject to a terminal disclaimer.

(21) Appl. No.: 13/262,130

(22) PCT Filed: Apr. 6, 2010

(86) PCT No.: PCT/JP2010/056200
§ 371 (c)(1),
(2), (4) Date: Sep. 29, 2011

(87) PCT Pub. No.: WO2010/116986
PCT Pub. Date: Oct. 14, 2010

(65) Prior Publication Data
US 2012/0020646 A1    Jan. 26, 2012

(30) Foreign Application Priority Data
Apr. 8, 2009    (JP) .................. 2009-093628

(51) Int. Cl.
*H04N 5/761*   (2006.01)
*G11B 27/034*  (2006.01)
*G11B 27/32*   (2006.01)
*H04N 5/85*    (2006.01)
*H04N 9/804*   (2006.01)

(52) U.S. Cl.
CPC ............ *G11B 27/034* (2013.01); *G11B 27/322* (2013.01); *G11B 2220/2541* (2013.01); *H04N 5/85* (2013.01); *H04N 9/8042* (2013.01)
USPC .......................... 386/284; 366/278

(58) Field of Classification Search
None
See application file for complete search history.

(56) References Cited

U.S. PATENT DOCUMENTS

2007/0174545 A1 * 7/2007 Okada et al. ............. 711/112
2007/0201832 A1   8/2007 Date et al.
2008/0240679 A1 * 10/2008 Shibutani et al. .......... 386/95

FOREIGN PATENT DOCUMENTS

JP    2000-173192    6/2000
JP    2004-080196    3/2004

(Continued)

*Primary Examiner* — William C Vaughn, Jr.
*Assistant Examiner* — Eileen Adams
(74) *Attorney, Agent, or Firm* — Sony Corporation

(57) ABSTRACT

A data recording/playback configuration whereby data compatible with a standard such as the BD standard, AVCHD standard, or the like, and data incompatible with a standard are usable is realized. In the event that recorded data is data compatible with a standard such as the BD standard, AVCHD standard, or the like at the time of data recording processing as to a medium, the management information of the data is recorded in a first management information file only for data compatible with a standard, and in the event that the recorded data is data incompatible with a standard, the management information of the data is recorded in a second management information file. Also, management information updating processing for recording all of management information recorded in the first management information file in the second management information file is performed. An existing device which executes only processing as to data compatible with a standard performs processing by applying first management information, and a new-type device which can perform processing as to data incompatible with a standard can play all of data by processing to which second management information has been applied.

6 Claims, 13 Drawing Sheets

(56) References Cited

FOREIGN PATENT DOCUMENTS

| | | |
|---|---|---|
| JP | 2007-179671 | 7/2007 |
| JP | 2007-243907 | 9/2007 |
| JP | 2008-005294 | 1/2008 |
| JP | 2008-005295 | 1/2008 |

* cited by examiner

FIG. 3

| Syntax |
|---|
| Movie PlayList File{ |
|   TypeIndicator |
|   TypeIndicatoror2 |
|   PlayListStartAddress |
|   PlaylistMarkStartAddress |
|   ExtensionDataStartAddress |
|   reserved |
|   blkApplicationPlayList() |
|   for (i=0;i<N1;i++){ |
|     padding_word |
|   } |
|   blkPlayList()  ← 200 |
|   for (i=0;i<N2;i++){ |
|     padding_word |
|   } |
|   blkPlayListMark() |
|   for (i=0;i<N3;i++){ |
|     padding_word |
|   } |
|   blkExtensionData() |
|   for (i=0;i<N4;i++){ |
|     padding_word |
|   } |
| } |

FIG. 5

| Syntax |
|---|
| HDEX Movie PlayList File{ |
| TypeIndicator |
| TypeIndicatoror2 |
| PlayListStartAddress |
| PlaylistMarkStartAddress |
| ExtensionDataStartAddress |
| reserved |
| blkApplicationPlayList() |
| for (i=0;i<N1;i++){ |
| padding_word |
| } |
| blkHDEXPlayList() |
| for (i=0;i<N2;i++){ |
| padding_word |
| } |
| blkPlayListMark() |
| for (i=0;i<N3;i++){ |
| padding_word |
| } |
| blkExtensionData() |
| for (i=0;i<N4;i++){ |
| padding_word |
| } |
| } |

(a)
| MediaFile | file:BDMV/CLIPINF/01000.clpi |
| --- | --- |
| MediaFileIdentifier | M2TS |

(b)
| MediaFile | file:hostA/VIDEO/100.mp4 |
| --- | --- |
| MediaFileIdentifier | ISOBMFF |

FIG. 8

| PLAYBACK DEVICE | MANAGEMENT FILE (DATABASE) ON MEDIUM | AVAILABLE MANAGEMENT INFORMATION (DATABASE) CORRESPONDING TO DATA TO BE PLAYED | PLAYBACK PROCESSING | |
|---|---|---|---|---|
| OLD-TYPE DEVICE: DEVICE NOT INTERPRETING EXTENDED MANAGEMENT INFORMATION (EXTENDED DATABASE) | ONLY EXISTING DATABASE | EXISTING DATABASE | PLAY ONLY STREAM FILE COMPATIBLE WITH EXISTING STANDARD USING EXISTING DATABASE | (1a) |
| | EXISTING DATABASE + EXTENDED DATABASE | EXISTING DATABASE | PLAY ONLY STREAM FILE COMPATIBLE WITH EXISTING STANDARD USING EXISTING DATABASE | (1b) |
| NEW-TYPE DEVICE: DEVICE INTERPRETING EXTENDED MANAGEMENT INFORMATION (EXTENDED DATABASE) | ONLY EXISTING DATABASE | EXISTING DATABASE | PLAY ONLY STREAM FILE COMPATIBLE WITH EXISTING STANDARD USING EXISTING DATABASE | (2a) |
| | EXISTING DATABASE + EXTENDED DATABASE | EXISTING DATABASE | PLAY ONLY STREAM FILE COMPATIBLE WITH EXISTING STANDARD USING EXISTING DATABASE | (2b) |
| | | EXTENDED DATABASE | PLAY STREAM FILE COMPATIBLE OR INCOMPATIBLE WITH EXISTING STANDARD USING EXTENDED DATABASE (EXECUTE CONSISTENCY ADJUSTMENT BETWEEN EXISTING DATABASE AND EXTENDED DATABASE) | (2c) |

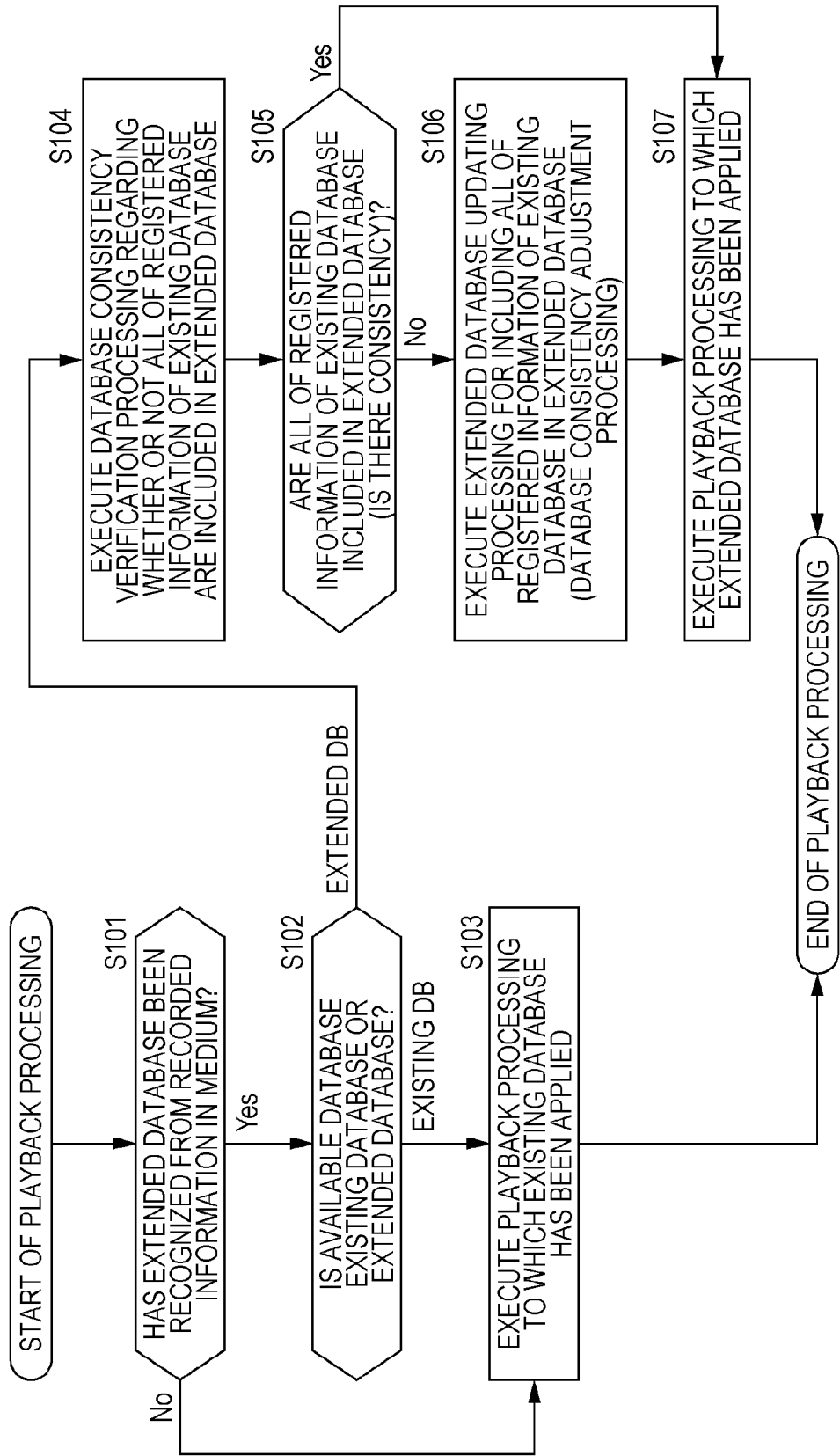

FIG. 10

| RECORDING DEVICE | MANAGEMENT FILE (DATABASE) ON MEDIUM (BEFORE RECORDING DATA) | TYPE OF DATA TO BE RECORDED | RECORDING PROCESSING | |
|---|---|---|---|---|
| OLD-TYPE DEVICE: DEVICE NOT INTERPRETING EXTENDED MANAGEMENT INFORMATION (EXTENDED DATABASE) | ONLY EXISTING DATABASE | DATA COMPATIBLE WITH EXISTING STANDARD | RECORD STREAM FILE COMPATIBLE WITH EXISTING STANDARD BY UPDATING EXISTING DATABASE | (1a) |
| | EXISTING DATABASE + EXTENDED DATABASE | DATA COMPATIBLE WITH EXISTING STANDARD | RECORD STREAM FILE COMPATIBLE WITH EXISTING STANDARD BY UPDATING EXISTING DATABASE | (1b) |
| NEW-TYPE DEVICE: DEVICE INTERPRETING EXTENDED MANAGEMENT INFORMATION (EXTENDED DATABASE) | ONLY EXISTING DATABASE | DATA COMPATIBLE WITH EXISTING STANDARD | RECORD STREAM FILE COMPATIBLE WITH EXISTING STANDARD BY UPDATING EXISTING DATABASE | (2a) |
| | | DATA INCOMPATIBLE WITH EXISTING STANDARD | CREATE EXTENDED DATABASE, UPDATE EXTENDED DATABASE TO RECORD STREAM FILE INCOMPATIBLE WITH EXISTING STANDARD, AND FURTHER REGISTER REGISTERED INFORMATION OF EXISTING DATABASE IN EXTENDED DATABASE (DATABASE CONSISTENCY ADJUSTMENT) | (2b) |
| | EXISTING DATABASE + EXTENDED DATABASE | DATA COMPATIBLE WITH EXISTING STANDARD | UPDATE EXISTING DATABASE TO RECORD STREAM FILE COMPATIBLE WITH EXISTING STANDARD, AND FURTHER REGISTER REGISTERED INFORMATION OF EXISTING DATABASE IN EXTENDED DATABASE (DATABASE CONSISTENCY ADJUSTMENT) | (2c) |
| | | DATA INCOMPATIBLE WITH EXISTING STANDARD | UPDATE EXTENDED DATABASE TO RECORD STREAM FILE INCOMPATIBLE WITH EXISTING STANDARD, AND FURTHER REGISTER REGISTERED INFORMATION OF EXISTING DATABASE IN EXTENDED DATABASE (DATABASE CONSISTENCY ADJUSTMENT) | (2d) |

INFORMATION PROCESSING APPARATUS, INFORMATION PROCESSING METHOD, AND PROGRAM

CROSS REFERENCE TO RELATED APPLICATIONS

This application claims the priority of U.S. national phase application no. PCT/JP2010, filed Apr. 6, 2010, which claims the priority of Japanese patent application number 2009-093628, filed in the Japanese Patent Office on Apr. 8, 2009, which is hereby incorporated by reference to the maximum extent allowable by law.

TECHNICAL FIELD

The present invention relates to an information processing device, an information processing method, and a program. Further, in detail, the present invention relates to an information processing device, an information processing method, and a program which execute data recording processing or data playback processing employing recording media such as discs, flash memory, and so forth.

BACKGROUND ART

For example, with a recording/playback device, a video camera, or the like, various media are employed, such as a hard disk, a disc-type medium such as DVD or Blu-ray Disc®, flash memory, and so forth.

In the event of performing data recording/playback employing media, a recording/playback application to be executed at a device performs data recording/playback processing in accordance with a format stipulated beforehand. For example, examples of the standard of a recording/playback format of high-definition Hi-Vision video include the AVCHD (Advanced Video Codec High Definition) standard, and BD (Blu-ray Disc) standard. Note that examples of descriptions regarding the AVCHD standard include Patent Literature 1 (Japanese Unexamined Patent Application Publication No. 2008-5294) and Patent Literature 2 (Japanese Unexamined Patent Application Publication No. 2008-5295). Also, examples of descriptions regarding the BD standard include Patent Literature 3 (Japanese Unexamined Patent Application Publication No. 2007-179671).

With the AVCHD standard and BD standard, a data format serving as an allowable object of recording processing or playback processing is stipulated. For example, in the event of performing recording/playback of an HD (High Definition) image, recording/playback of data in a predetermined format is performed, such as 1080/60i, 1080/50i, or the like. Note that [1080/60i] indicates that recording/playback of 1080 lines is performed with an HD (High Definition) image of 1920×1080 pixels as 60 field images per one second using the interlace method. [i] indicates the interlace method. Incidentally, the progressive method is indicated with [p].

The current Hi-Vision data is stipulated as an image of 1920×1080 pixels, but further, there has been developed a device which performs recording and playback of an image of around 4000×2000 pixels (=4 K×2 K) as a high-definition image. Also, development of various devices has been performed, such as a device which performs [1080/60p] for performing recording/playback by the progressive method different from the above-mentioned interlace method, or a device for performing recording/playback of an image for the right eye and an image for the left eye for a 3D image that is a three-dimensional stereoscopic image.

However, with the AVCHD standard and BD standard, a 4K×2K image, 1080/60p, and 3D image data are not allowed as recording/playback data. Accordingly, this leads to a problem wherein even if a 4K×2K ultra-high-definition image is generated as recorded data, data recording to which the existing AVCHD standard or BD standard has been applied may not be performed.

As one solution to solve this problem, it can be conceived to define a new standard for recording various images such as a [4K×2K] image, [1080/60p], [3D] imager, and further [1080/60i] that is the current high-definition image, and so forth. However, in the event that such a new standard has been defined, this causes a problem wherein an existing device which performs data recording and playback in accordance with the existing AVCHD standard or BD standard may not be used.

CITATION LIST

Patent Literature

PTL 1: Japanese Unexamined Patent Application Publication No. 2008-5294
PTL 2: Japanese Unexamined Patent Application Publication No. 2008-5295
PTL 3: Japanese Unexamined Patent Application Publication No. 2007-179671

SUMMARY OF INVENTION

Technical Problem

The present invention has been made in light of the above-mentioned situation, and its object is to provide an information processing device, an information processing method, and a program which enable both of data compatible with a standard conforming to the existing AVCHD standard or BD standard, and data incompatible with a standard not conforming to the AVCHD standard or BD standard to be recorded, and also enables at least data compatible with a standard to be handled at an existing device which performs data recording/playback in accordance with the AVCHD standard or BD standard.

Solution to Problem

A first aspect of the present invention is an information processing device including: a data processing unit configured to perform generation or updating processing of a data file including data for playback, and a management information file including the management information of this data file at the time of data recording processing as to a medium; with the data processing unit performing processing to record the management information of the data file in a first management information file only for data compatible with a standard in the event that recorded data to be stored in the data file is data compatible with a standard conforming to a predetermined stipulated data recording/playback format, and to record the management information of the data file in a second management information file different from the first management information file in the event that the stored data of the data file is data incompatible with a standard not conforming to a predetermined stipulated data recording/playback format.

Further, with an embodiment of the information processing device according to the present invention, the data processing unit performs management information file updating processing for additionally recording the management information of data included in the first management information file but not included in the second management information file in the second management information file.

Further, with an embodiment of the information processing device according to the present invention, the data processing unit performs updating processing for setting the second management information file so as to include information whereby all of data files in which data for playback recorded in a medium is stored can be accessed.

Further, with an embodiment of the information processing device according to the present invention, the standard of the predetermined data recording/playback format is either the BD standard or the AVCHD standard; with the data processing unit setting the first management information file as a file including an index file, a move object file, and a playlist file which are applied to only data compatible with a standard conforming to the BD standard or AVCHD standard, and setting the second management information file as a file including an index file, a move object file, and a playlist file which are applied to data incompatible with a standard not conforming to the BD standard or AVCHD standard, and data compatible with a standard conforming to the BD standard or AVCHD standard.

Further, with an embodiment of the information processing device according to the present invention, the data processing unit performs recorded data management according to a directory configuration where a directory that is a management configuration of data recorded in a medium is set with a directory for setting the first management information file, and a directory for setting the second management information file as separate individual directories.

Further, with an embodiment of the information processing device according to the present invention, the data processing unit performs playlist setting processing for enabling data compatible with a standard conforming to the BD standard or AVCHD standard to be executed even if either a playlist file included in the first management information file or a playlist file included in the second management information file is applied.

Further, with an embodiment of the information processing device according to the present invention, the standard of the predetermined data recording/playback format is either the BD standard or AVCHD standard; with the data processing unit performing processing to set the first management information file as a file including an index file and a movie object file which apply to only data compatible with a standard conforming to the BD standard or AVCHD standard, and to set the second management information file as a file including an index file and a movie object file which apply to data incompatible with a standard not conforming to the BD standard or AVCHD standard, and data compatible with a standard conforming to the BD standard or AVCHD standard.

Further, with an embodiment of the information processing device according to the present invention, the data processing unit performs recorded data management according to a directory configuration where a directory which is a management configuration of data recorded in a medium is set with a directory for setting the first management information file, and a directory for setting the second management information file as a common directory.

Further, a second aspect of the present invention is an information processing device including: a data processing unit configured to perform playback processing of data from a medium; with the data processing unit executing detection processing of a second management information file in which management information of both data of data compatible with a standard conforming to a predetermined data recording/playback format, and data incompatible with a standard not conforming to a predetermined data recording/playback format are recorded, and in the event that the second management information file has been detected, applies the second management information file to obtain a data file in which the data to be played is stored, and executing playback processing, and in the event that the second management information file has not been detected, applies a first management information file only for data compatible with a standard conforming to a predetermined data recording/playback format to obtain a data file in which the data to be played is stored, and executing playback processing.

Further, with an embodiment of the information processing device according to the present invention, the data processing unit performs management information file updating processing for additionally recording the management information of data included in the first management information file but not included in the second management information file in the second management information file.

Further, with an embodiment of the information processing device according to the present invention, in the event of performing playback processing to which the second management information file has been applied, the data processing unit executes verification processing regarding whether or not there is the management information of data included in the first management information file but not included in the second management information file, and in the event that determination is made that there is the management information of such data, execute the management information file updating processing, and after completion of this management information file updating processing, perform playback processing to which the second management information file has been applied.

Further, a third aspect of the present invention is an information processing device which is characterized in that the information processing device includes a data processing unit configured to perform playback processing of data from a medium, and with the medium, A) Data to be played is data compatible with a standard conforming to a predetermined stipulated data recording/playback format, B) A basic management information file where the data compatible with a standard is managed, C) Data to be played is data incompatible with a standard not conforming to a predetermined stipulated data recording/playback format, D) An extended management information file corresponding to the data incompatible with a standard are recorded, and the data processing unit verifies whether or not data compatible with a standard managed in a management information file of the data compatible with a standard is managed by the extended management information file, and 1) In the event of being not managed, excluded data compatible with a standard thereof is synthesized with the extended management information file, and based on the synthesized extended management information file, playback processing of the data compatible with a standard, and the data incompatible with a standard is performed, 2) In the event of being managed, playback processing of the data compatible with a standard, and the data incompatible with a standard is performed based on the extended management information file.

Further, a fourth aspect of the present invention is an information processing method that an information processing device executes, including: a data processing step for a data processing unit performing generation or updating processing of a data file including data to be played, and a management information file including the management information of this data file at the time of data recording processing as to a medium; with the data processing step including a step for recording, in the event that recorded data stored in the data file is data compatible with a standard conforming to a predetermined stipulated data recording/playback format, the management information of the data file in a first management information file only for data compatible with a standard, and a step for recording, in the event that recorded data stored in the data file is data incompatible with a standard not conforming to a predetermined data recording/playback format, the management information of the data file in a second management information file different from the first management information file.

Further, a fifth aspect of the present invention is an information processing method that an information processing device executes, including: a data processing step for a data processing unit performing playback processing of data from a medium; with the data processing step including the step of executing detection processing of a second management information file in which the management information of both data of data compatible with a standard conforming to a predetermined data recording/playback format, and data incompatible with a standard not conforming to a predetermined data recording/playback format is recorded, executing playback processing by applying, in the event that the second management information file has been detected, the second management information file to obtain a data file in which the data to be played is stored, and executing playback processing by applying, in the event that the second management information file has not been detected, a first management information file only for data compatible with a standard conforming to a predetermined data recording/playback format to obtain a data file in which the data to be played is stored.

Further, a sixth aspect of the present invention is a program causing an information processing device to execute information processing, including: a data processing step causing a data processing unit to perform generation or playback processing of a data file including data for playback, and a management information file including the management information of this data file at the time of data recording processing as to a medium; with the data processing step including a step for recording, in the event that recorded data stored in the data file is data compatible with a standard conforming to a predetermined stipulated data recording/playback format, the management information of the data file in a first management information file only for data compatible with a standard, and a step for recording, in the event that recorded data stored in the data file is data incompatible with a standard not conforming to a predetermined stipulated data recording/playback format, the management information of the data file in a second management information file different from the first management information file.

Further, a seventh aspect of the present invention is a program causing an information processing device to execute information processing, including: a data processing step causing a data processing unit to perform playback processing of data from a medium; with the data processing step including the step of executing detection processing of a second management information file in which the management information of both data of data compatible with a standard conforming to a predetermined data recording/playback format, and data incompatible with a standard not conforming to a predetermined data recording/playback format is recorded, executing playback processing by applying, in the event that the second management information file has been detected, the second management information file to obtain a data file in which the data to be played is stored, and executing playback processing by applying, in the event that the second management information file has not been detected, a first management information file only for data compatible with a standard conforming to a predetermined data recording/playback format to obtain a data file in which the data to be played is stored.

Note that a program according to the present invention is a program which can be provided to an image processing device or computer system which can execute various program codes by a storage medium or communication medium which is provided in a computer-readable format. Such a program is provided in a computer-readable format, thereby realizing processing according to the program on the image processing device or computer system.

Further other objects, features, and advantages of the present invention will become clearer by more detailed description based on later-described embodiments of the present invention, and appended drawings. Note that, with the present Specification, the term system is a logical group configuration of multiple devices, and the device of each configuration is not restricted to be included in the same casing.

Advantageous Effects of Invention

According to an embodiment of the present invention, at the time of data recording processing as to a medium, in the event that recorded data is data compatible with a standard such as the BD standard or AVCHD standard, the management information of the data is recorded in a first management information file only for data compatible with a standard, and in the event of data incompatible with a standard, the management information of the data is recorded in a second management information file. Also, management information updating processing for recording all of management information recorded in the first management information file in the second management information file is performed. An existing device which executes only processing as to data compatible with a standard performs processing by applying the first management information, and a new-type device which can perform processing as to data incompatible with a standard can play all of data by processing to which the second management information has been applied.

BRIEF DESCRIPTION OF DRAWINGS

FIG. 3 is a diagram for describing the outline of a playlist file compatible with the BD standard and AVCHD standard.

FIG. 5 is a diagram for describing a playlist file included in extended management information (extended database).

FIG. 7 is a diagram for describing a data example of a playlist file included in extended management information (extended database).

FIG. 8 is a diagram for describing the processing mode of data playback processing according to a device and medium state.

FIG. 9 is a diagram illustrating a flowchart for describing the sequence of the data playback processing that an information processing device according to an embodiment of the present invention executes.

FIG. 10 is a diagram for describing the processing mode of data recording processing according to a device and medium state.

DESCRIPTION OF EMBODIMENTS

The details of an information processing device, an information processing method, and a program according to the present invention will be described below with reference to the drawings. Description will be performed in accordance with the following items.
1. Outlines of BD Standard and AVCHD Standard
2. Recorded Data Management Configuration Example Enabling Recording/Playback of Data Compatible with Standard and Data Incompatible with Standard (First Embodiment)
3. Configuration of Playlist
4. Data Playback Processing from Media and Data Recording Processing as to Media
5. Recorded Data Management Configuration Example Enabling Recording/Playback of Data Compatible with Standard and Data Incompatible with Standard (Second Embodiment)
6. Configuration Example of Information Processing Device 1. Outlines of BD Standard and AVCHD Standard First, the outlines of the existing BD standard and AVCHD standard will be described. As described above, the BD (Blu-ray Disc) standard, and AVCHD (Advanced Video Codec High Definition) standard are both the standard of a data recording/playback format whereby high-definition Hi-Vision video is recordable for example, which has been used for the current video cameras, BD recording/playback devices, and so forth.

Figure 1:
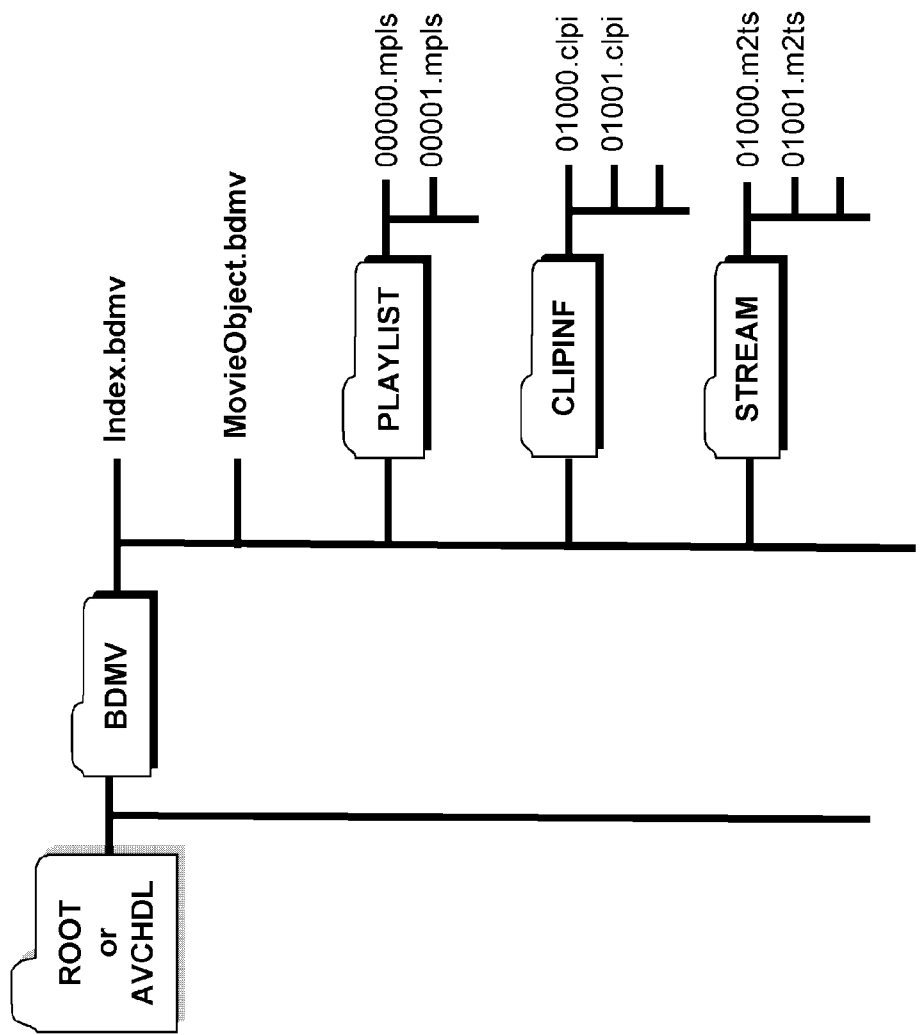
FIG. 1 is a diagram illustrating a directory configuration serving as the file management configuration of a medium (information recording medium) conforming to the BD standard and AVCHD standard.

FIG. 1 is a diagram illustrating the management configuration of data to be recorded in a medium (information recording medium) in accordance with the BD standard or AVCHD standard, i.e., a directory configuration. With both of the BD standard and the AVCHD standard, in the event of recording data in a medium, for example, a moving image stream is encoded in a MPEG2-TS stream, and recorded.

At the time of data recording processing, as shown in FIG. 1, the following files are generated and recorded.
index (index),
movie object (MovieObject),
playlist (PlayList),
clip information (ClipInformation), and
clip AV stream (ClipAVStream)

Actual data made up of video and audio is stored in the clip AV stream file as an MPEG2-TS stream.

As shown FIG. 1, a directory [BDMV] is disposed beneath the root [Root] directory. An index file [index.bdmv] and a movie object file [MovieObject.bdmv] are recorded just beneath the directory [BDMV]. Further, a playlist directory [PLAYLIST], a clip information directory [CLIPINF], and a stream directory [STREAM] are set as lower directories of the BDMV directory [BDMV].

Playlist files [xxxxx.mpls] are set in the playlist directory [PLAYLIST], and clip information files [xxxxx.clpi] are set in the clip information directory [CLIPINF], and clip AV stream files [xxxxx.m2ts] are set in the stream directory [STREAM].

The index file, movie object file, and playlist files are management information files to be applied to playback of data stored in the clip AV stream file. These management information files will also be referred to as database files or databases. Hereafter, the details of the files will be described.

The index file [index.bdmv] is a management information file regarding the recorded data of the entire medium. An example of this is a management information file in which an index (correspondence information between a title and a movie object, etc.) is recorded for each title set as the units of recorded data. Note that, with the AVCHD format, the playback order of playlists to be originally managed with a movie object file is managed within the meta data of the index file. At the time of mounting an information recorded medium on a player, the index file is first read in, and the user can perform playback specification by viewing titles described in the index file.

The movie object file [MovieObject.bdmv] is a file in which the management information of playlists is stored. Reference information as to the movie object is recorded in the index file. However, with the AVCHD format, a relation between a playlist and a title is managed by the meta data of the index file without referencing the movie object file.

Playlist files [xxxxx.mpls] to be recorded in the playlist directory [PLAYLIST] are provided corresponding to titles to be shown as to the user, and are a playback list made up of one or more play items. The play items are playback section specification information having a playback start point (IN point) and a playback end point (OUT point) as to a clip. Multiple play items within a playlist are arrayed on the temporal axis, whereby the playback order of each of the playback sections can be specified.

A clip information file [xxxxx.clpi] to be recorded in the clip information directory [CLIPINF] is set so as to correspond to a clip AV stream file [xxxxx.m2ts] to be recorded in the stream directory [STREAM]. The clip information files are files in which information relating to a stream necessary for playing an actual stream is described.

A clip AV stream file [xxxxx.m2ts] to be recorded in the stream directory [STREAM] is a file in which a stream recorded in a MPEG2-TS format is stored. Image data is stored in this file.

In this way, with the BD standard and AVCHD standard, as shown in FIG. 1, the files of an index file, a move object file, a playlist file, a clip information file, and a clip AV stream file are recorded in the BDMV directory.

Note that description will be made below by generically naming a file in which data to be played is stored such as a clip AV stream file a stream file in a simplified manner. Also, an index file, a movie object file, and a playlist file, these files are generically named as management information or database.

2. Recorded Data Management Configuration Example Enabling Recording/Playback of Data Compatible with Standard and Data Incompatible with Standard First Embodiment As described with reference to FIG. 1, in the event of performing data recording in accordance with the BD standard or AVCHD standard, the files of an index file, a move object file, a playlist file, a clip information file, and a clip AV stream file are recorded in the BDMV directory.

However, as described above, with the BD standard and AVCHD standard, a 4K×2K image that is ultra-high-definition image data, 1080/60p, and 3D image data are not allowed as recording/playback data. Accordingly, even if a 4K×2K ultra-high-definition image, 1080/60p, or 3D image data is generated as recording data, it is expected that an error will occur at the time of data recording or data playback processing to which the existing AVCHD standard or BD standard has been applied.

Figure 2:
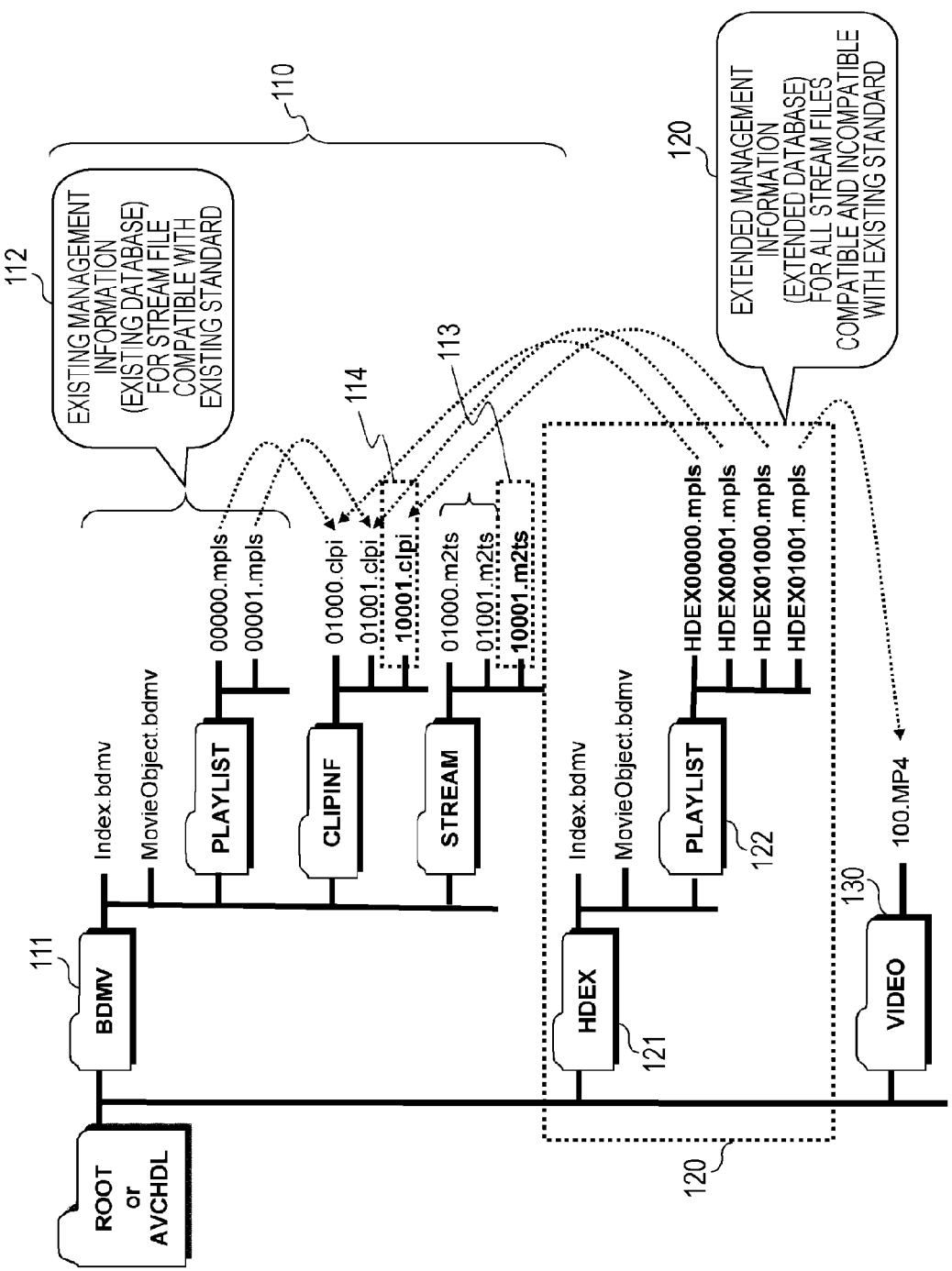
FIG. 2 is a diagram illustrating a directory configuration serving as the management configuration of recorded data for a medium according to an embodiment of the present invention.

A first embodiment that solves such a problem will be described with reference to FIG. 2 and thereafter. FIG. 2 is a diagram illustrating the management configuration of recorded data in a medium mounted on the information processing device according to the present embodiment, i.e., a directory configuration. The information processing device in accordance with an embodiment of the present invention records the files in the medium in accordance with a directory configuration as shown in FIG. 2.

The directory shown in FIG. 2 is a directory where both of data compatible with a standard allowed as recording/playback data with the BD standard and AVCHD standard, and data incompatible with a standard not allowed as recording/playback data with the BD standard and AVCHD standard may be set.

With the directory configuration shown in FIG. 2, a directory portion 110 shown on the upper side includes the same directory configuration as previously described with reference to FIG. 1, i.e., a directory configuration conforming to the existing BD standard or AVCHD standard. The directory portion 110 has a configuration where the files of an index file, a move object file, a playlist file, a clip information file, and a clip AV stream file are set in a BDMV directory 111. This BDMV directory 111 may also be available at an existing device which executes data recording/playback of only data compatible with the existing BD standard or AVCHD standard.

With the existing management information (existing database) 112 of the BDMV directory 111, a file corresponding to the existing management information (existing database) corresponding to a stream file conforming to the existing BD standard or AVCHD standard is set. Specifically, files corresponding to the following existing management information (existing database) are set.
  index (index),
  movie object (MovieObject), and
  playlist (PlayList)

Note that, with the directory shown in FIG. 2, of three files set in the stream file directory [STREAM], the upper two files, i.e.,
  [01000.m2ts] and
  [01001.m2ts],
these stream files are stream files compatible with existing standard conforming to the existing BD standard or AVCHD standard.

On the other hand, the file shown in the lowermost tier, i.e.,
  [01001.m2ts],
this stream file is a stream file 113 incompatible with a standard made up of, for example, 4K×2K data not allowed with the BD standard and AVCHD standard.

Also, of three clip information files set in the clip information directory [CLIPINF], the upper two files, i.e.,
  [01000.clpi] and
  [01001.clpi],
these clip information files are clip information files corresponding to [01000.m2ts] and [01001.m2ts] that are stream files compatible with existing standard conforming to the existing BD standard or AVCHD standard.

On the other hand, the clip information file shown in the lowermost tier, i.e.,
  [10001.clpi],
this clip information file corresponds to the stream file [10001.m2ts] 113 made up of, for example, 4K×2K data not allowed with the BD standard and AVCHD standard.

Clip information files and stream files may be set in the clip information directory [CLIPINF] and stream directory [STREAM] within the directory portion 110 shown on the upper side without regard to compatible with existing standard conforming to the existing BD standard or AVCHD standard, or incompatible.

However, with the directory portion 110 on the upper portion shown in FIG. 2, i.e., the existing management information (existing database) 112 of the BDMV directory 111, only management information (database) corresponding to a stream file conforming to the existing BD standard or AVCHD standard is set. Specifically, of the management information (database) file setting unit 112, with the files of index (index),
  movie object (MovieObject), and
  playlist (PlayList),
the upper two files [01000.clpi] and [01001.clpi] of three clip information files set in the clip information directory [CLIPINF], the upper two files [01000.m2ts] and [01001.m2ts] of the three files set in the stream file directory [STREAM], and management information for data compatible with a standard of these are only recorded.

Dotted arrows connecting a playlist file shown in FIG. 2 and a clip information file are arrows indicating correspondence between each playlist file, and a clip information file serving as a reference destination recorded in the playlist file thereof. For example, the identifier of a clip information file is recorded in a playlist file, a particular clip information file is selected according to this identifier, and playback of a stream file set so as to correspond to the selected clip information file can be performed.

Management information corresponding to data incompatible with a standard conforming to neither the BD standard nor the AVCHD standard is recorded only in the extended management information (database) 120 shown in the lower portion in FIG. 2.

According to such a setting, a device which performs data playback processing conforming to at least the existing BD standard or AVCHD standard can perform data recording/playback by processing conforming to the existing BD standard or AVCHD standard using the existing management information (existing database) 112 regarding the stream files [01000.m2ts] and [01001.m2ts] compatible with existing standard.

On the other hand, the extended management information (extended database) 120 shown in the lower portion in FIG. 2 is set to an additional directory (HDEX directory 121) set by a device according to the present embodiment different from a directory conforming to the existing BD standard or AVCHD standard.

With the present embodiment, the extended management information (extended database) 120 is set to the additional directory set just beneath the root in parallel with the BDMV directory 111 which is a lower directory just beneath the root (ROOT). Note that this additional directory will be taken here as an HDEX directory 121.

With the HDEX directory 121, an index file and a movie object file are set, and further, a playlist directory 122 is set as a lower directory. A playlist file is set to the playlist directory 122. Regions for setting a clip information file and a stream file are not provided to the HDEX directory 121.

With the HDEX directory 121, a stream file compatible with existing standard conforming to the existing BD standard or AVCHD standard, and extended management information (extended database) corresponding to all of the stream files other than the exiting standards incompatible with the existing BD standard or AVCHD standard are set.

Specifically, the extended management information (extended database) 120 made up the files of
index (index),
movie object (MovieObject), and
playlist (PlayList)
is set.

With the playlist directory 122, playlist files with all of the clip information files as files to be referenced to be set in the clip information directory of the directory portion 110 are set like dotted arrows shown in FIG. 2.

As shown in FIG. 2,
a playlist file [HDEX00000.mpls] takes a clip information file [01000.clpi] corresponding to a stream file [01000.m2ts] compatible with the existing BD standard or AVCHD standard as a reference file.

A playlist file [HDEX00001.mpls] also takes a clip information file [01001.clpi] corresponding to a stream file [01001.m2ts] compatible with the existing BD standard or AVCHD standard as a reference file.

A playlist file [HDEX01000.mpls] takes a clip information file [10001.clpi] corresponding to a stream file [10001.m2ts] incompatible with the existing BD standard or AVCHD standard as a reference file.

Also, another playlist file [HDEX01001.mpls] takes [100.MP4] that is an MPEG4 file set in a video [VIDEO] directory 130 set as a directory just beneath of the root directory, as a reference file.

Note that, according to a clip information file to be referenced as a playlist file, the stream file corresponding to the clip information file thereof is read out and played. However, the MPEG4 file [100.MP4] set to the video [VIDEO] directory 130 is directly played using a playlist file instead of a clip information file.

It is a new-type information recording device or information playback device in which a program can recognize and interpret an HEDX directory is implemented to recognize the HDEX directory 121. An old-type device, i.e., a device which performs data recording or playback conforming to the existing BD standard or AVCHD standard alone cannot interpret the HDEX directory 121, and accordingly performs processing assuming that there is no file set to this directory, i.e., no extended management information (extended database) including an index file, a movie object file, and a playlist file.

Specifically, the old-type device interprets the BDMV directory 111, and uses the existing management information (existing database) 112 set to the BDMV directory 111, whereby only a stream file compatible with the existing BD standard or AVCHD standard can be played.

The new-type information recording device or information playback device in which a program that recognizes and interprets the HDEX directory 121 is implemented can recognize and interpret the entire directory shown in FIG. 2. For example, at the time of data playback, processing using an index file through a playlist file included in the extended management information (extended database) set to the HDEX directory 121 may be performed, and the existing management information (existing database) 112 set to the BDMV directory 111 may be used.

Playback of a stream file incompatible with existing standard not conforming to the existing BD standard or AVCHD standard may be performed by using an index file through a playlist file included in the extended management information (extended database) 120, and further, playback of a stream file compatible with existing standard conforming to the existing BD standard or AVCHD standard may be performed.

This is because a stream file compatible with existing standard conforming to the existing BD standard or AVCHD standard, and a playlist file to be applied to playback processing of all of stream files incompatible with existing standard are set to the HDEX directory 121.

Note that, with an index file and a movie object file included in the extended management information (extended database) 120 set to the HDEX directory 121, a stream file compatible with existing standard conforming to the existing BD standard or AVCHD standard, and management information such as a title corresponding to all of stream files incompatible with existing standard, and so forth are recorded.

Note that, with the old-type device, in the case that data recording as to the medium has been performed, and only the existing management information (existing database) 112 has been updated, in the event of mounting the medium thereof on the new-type device to execute playback processing, or the like, extended database updating processing for recording the updated data of the existing management information (existing database) 112 in the extended management information (extended database) 120 is performed. According to this processing, the extended management information (extended database) 120 is set so as to include all of the management information recorded in the existing management information (existing database) 112. This processing will be described later in detail.

In this way, the new-type information recording device or information playback device in which a program that recognizes the HDEX directory is implemented uses the extended management information (extended database) 120 of the HDEX directory 121, i.e.,
the index file,
movie object file,
and playlist file,
and according to data playback to which a clip information file
and a stream file of the BDMV directory 111 on the upper tier shown in FIG. 2 have been applied, both of a stream file compatible with existing standard (BD standard, AVCHD standard), and a stream file incompatible with existing standard may be played.

Also, an old-type information recording device or information playback device in which a program that recognizes the HDEX directory is not implemented does not have to interpret the HDEX directory 121, uses the existing management information (existing database) 112 of the BDMV directory 111, i.e., the index file,
movie object file,
and playlist file to perform data playback to which a clip information file
and a stream file in the BDMV directory 111 have been applied.

3. Configuration of Playlist

Next, a configuration example of a playlist file according to the present embodiment will be described. With the directory configuration shown in FIG. 2, the following two different playlist files are included.

(1) A playlist file included in the existing management information (existing database) 112 set to the playlist directory [PLAYLIST] set to the BDMV directory 111.

(2) A playlist file included in the extended management information (extended database) 120 set to the playlist directory [PLAYLIST] set to the HDEX directory 121.

A playlist file included in the existing management information (existing database) 112 set to the BDMV directory 111 is a playlist file compatible with the existing BD standard or AVCHD standard.

On the other hand, a playlist file included in the extended management information (extended database) 120 set to the HDEX directory 121 has a data structure different from the playlist file compatible with the existing BD standard or AVCHD standard.

First, the outline of a playlist file included in the existing management information (existing database) 112 set to the BDMV directory 111, i.e., a playlist file compatible with the existing BD standard or AVCHD standard will be described with reference to FIG. 3 through FIG. 4. FIG. 3 is a syntax indicating an example of a playlist file included in the existing management information (existing database) 112.

As described above, a playlist file [xxxxx.mpls] is provided corresponding to a title to be shown as to the user, and is a playback list made up of at least one or more play items. The play items are playback section specification information having a playback start point (IN point) and a playback end point (OUT point) as to a clip. Multiple play items within a playlist are arrayed on the temporal axis, whereby the playback order of each of the playback sections can be specified.

As shown in FIG. 3, with a playlist file, first, type information [TypeIndicator] is recorded, and then the start address information of each entity data [PlayListStartAddress] through [ExtensionStartAddress] are recorded, and then the recorded fields of entity data recorded in the playlist file [blkApplicationPlayList( )] through [blkExtensionData( )] are recorded.

Figure 4:
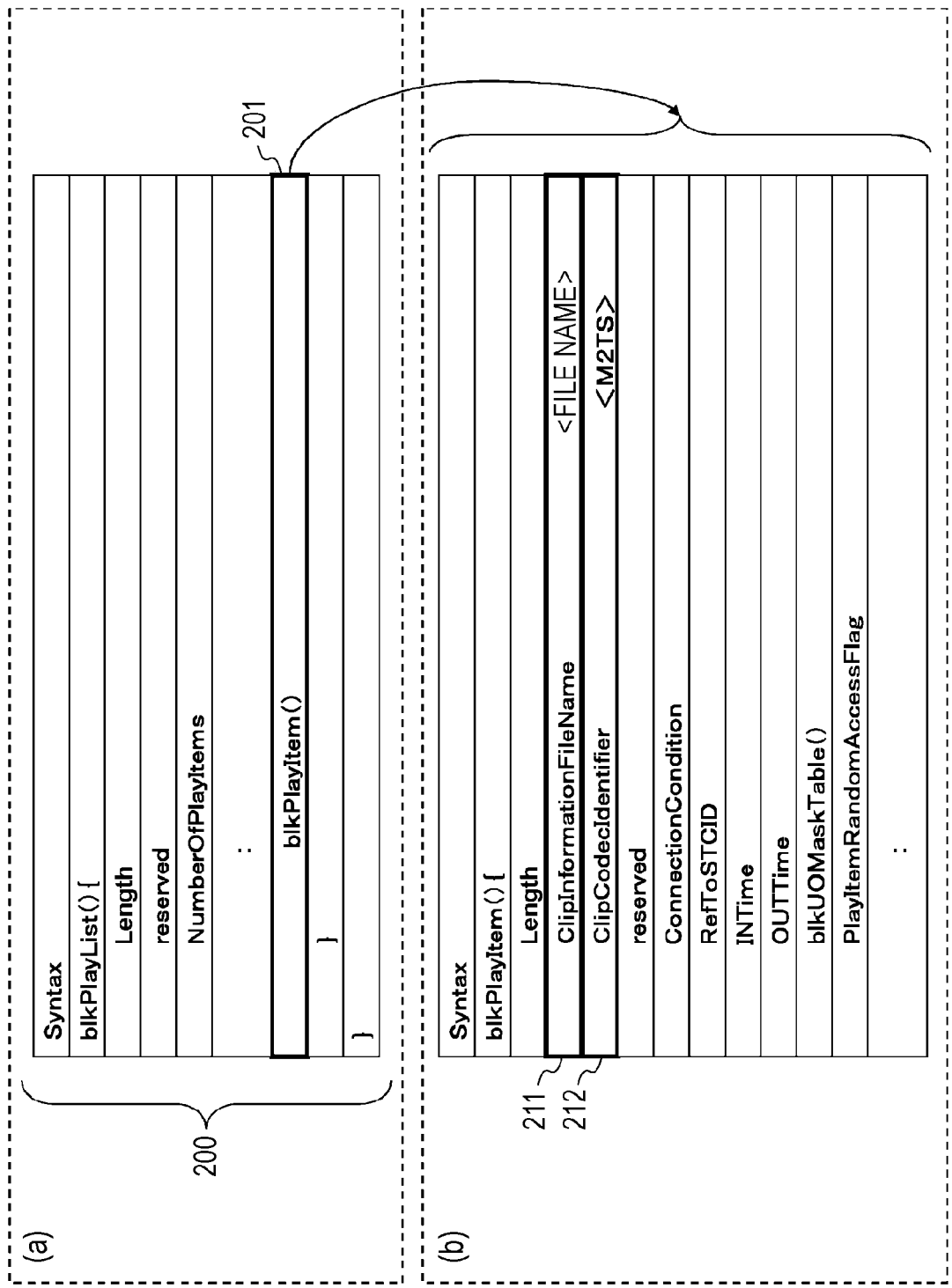
FIG. 4 is a diagram for describing the outline of a playlist file compatible with the BD standard and AVCHD standard.

(a) in FIG. 4 indicates the syntax of one entry of a playlist information block [blkPlayList( )] 200 that is the structured data of the playlist file shown in FIG. 3. With the playlist information block, information relating to play items set to a playlist is recorded. The play items are playback section specification information having a playback start point (IN point) and a playback end point (OUT point) as to a clip.

(b) in FIG. 4 indicates the syntax of one entry of a play item block [blkPlayItem( )] 201 of the playlist information shown in (a) in FIG. 4.

With a clip information file name [ClipInformationFileName] field 211, the file name of clip information serving as the reference destination of a playlist is recorded. Specifically, for example, in the event that the file name of clip information file serving as the reference destination is [01000.clpi], the top five letters [01000] is recorded in this clip information file name field 211.

With a clip codec identifier [ClipCodecIdentifier] field 212 below thereof, [M2TS] is described in the event that a stream file in which the codec information of a stream file to be played by a playlist is recorded is an MPEG2-TS file.

A playback device which executes playback processing determines a clip information file serving as a reference destination using these information recorded in a playlist file, and reads out a stream file correlated with the clip information file, and performs playback processing.

Next, a playlist file included in the extended management information (extended database) 120 set to the HDEX directory 121 will be described with reference to FIG. 5 through FIG. 7. FIG. 5 is a syntax showing an example of a playlist file included in the extended management information (extended database) 120.

The playlist file shown in FIG. 5 has generally the same data structure as the playlist file shown in FIG. 3. Type information [TypeIndicator] is recorded, and then the start address information of each entity data [PlayListStartAddress] through [ExtensionStartAddress] are recorded, and then the recorded fields of entity data recorded in the playlist file [blkApplicationPlayList( )] through [blkExtensionData( )] are recorded. These data structures are the same.

Figure 6:
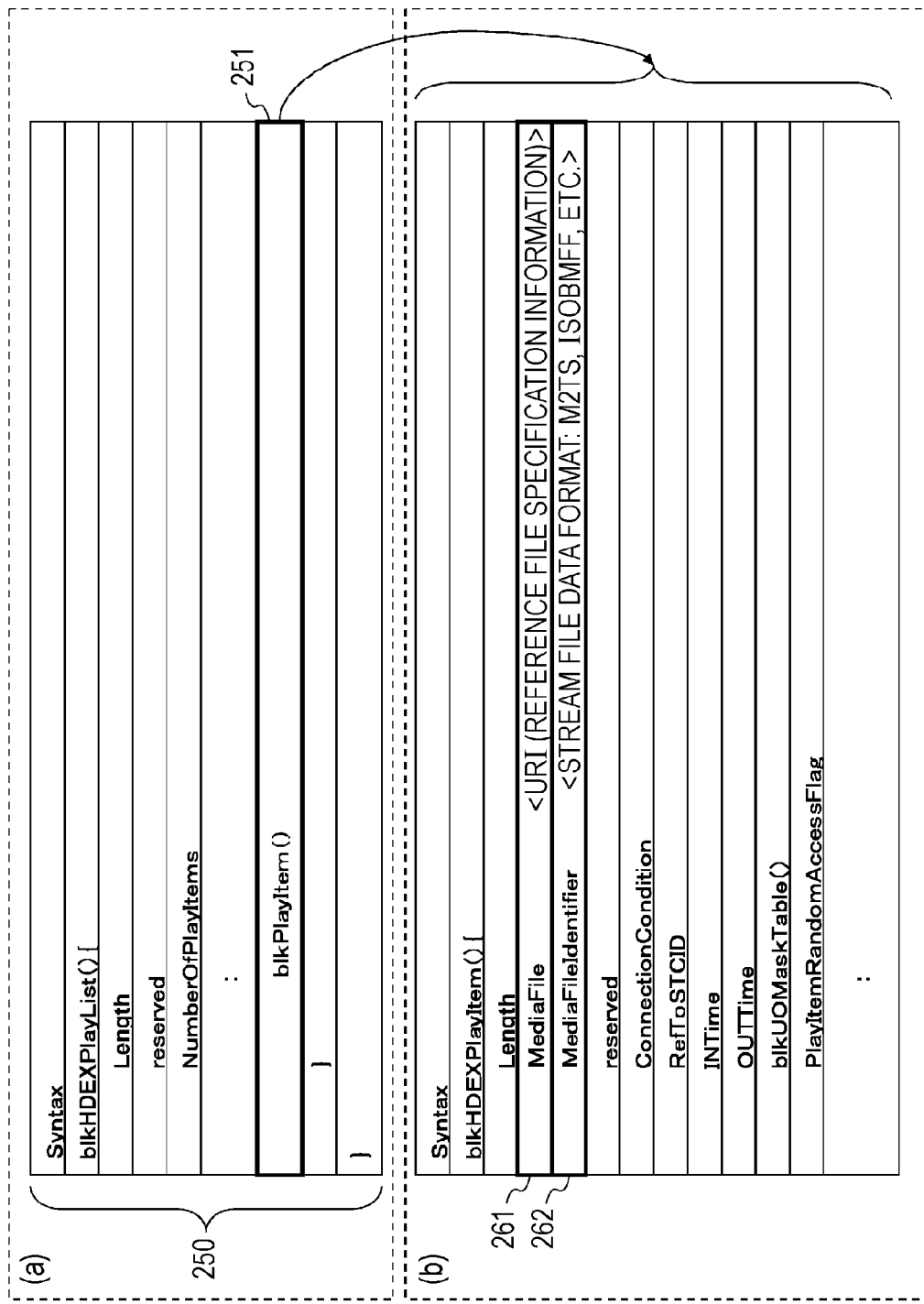
FIG. 6 is a diagram for describing a playlist file included in extended management information (extended database).

(a) in FIG. 6 indicates the syntax of one entry of a playlist information block [blkPlayList( )] 250 that is the structured data of the playlist file shown in FIG. 5. With the playlist information block, information relating to play items set to a playlist is recorded. The play items are playback section specification information having a playback start point (IN point) and a playback end point (OUT point) as to a clip.

(b) in FIG. 6 indicates the syntax of one entry of a play item block [blkPlayItem( )] 251 of the playlist information shown in (a) in FIG. 6.

A media file [MediaFile] field 261 shown in (b) in FIG. 6 is a filed corresponding to the clip information file name [ClipInformationFileName] field 211 of a playlist file of the existing management information (existing database) previously described with reference to (b) in FIG. 4.

With this media file [MediaFile] field 261, a clip information file serving as a reference destination of a playlist, or a URI (Uniform Resource Identifier) serving as the identification information of a stream file or data file in which data to be played is stored is recorded.

The URI is resource identification information stipulated by W3C (RFC3986), a clip information file or stream file serving as the reference destination of this playlist can be determined by the URI.

Specifically, for example, in the event that this playlist file is the first playlist file [HDEX00000.mpls] of the extended database 120 shown in FIG. 2, the clip information file serving as the reference destination thereof is the clip information file [01000.clpi] shown by an arrow shown in FIG. 2. The URI of this clip information file [01000.clpi] has the following structure as shown in (a) in FIG. 7.

URI=file:/BDMV/CLPINF/01000.clpi

This URI information is recorded in the media file [MediaFile] field 261 shown in (b) in FIG. 6.

Also, in the event of a playlist conforming to MPEG4 data set to the video directory [VIDEO] 130 shown in FIG. 2, the description of the URI to be recorded in the media file {MediaFile} field 261 has the following structure as shown in (b) in FIG. 7.

URI=file:hostA/VIDEO/100.mp4

Note that the URI is set to the media file [MediaFile] field 261, whereby a data file stored in another device which can be accessed via a network can also be set as a reference destination file, for example.

A media file identifier [MediaFileIdentifier] field 262 below the media file [MediaFile] field 261 shown in (b) in FIG. 6 is a filed corresponding to the clip codec identifier [ClipCodecIdentifier] filed 212 of a playlist file of the existing management information (existing database) previously described with reference to (b) in FIG. 4.

With this media file identifier [MediaFileIdentifier] field 262, the data format information of a stream file to be played by a playlist is recorded.

As shown in FIG. 7, for example, in the event that a stream file to be played by this playlist is MPEG2-TS, [M2TS] is recorded. [M2TS] indicates data conforming to a MPEG-2 Transport Stream.

Also, in the event that a stream file to be played by this playlist is MPEG4, [ISOBMFF] or [MP4] is recorded. Note that [ISOBMFF] indicates data conforming to ISO base media format, which is an expression format conforming to the ISO standard of MPEG4 data.

Note that, with the clip codec identifier [ClipCodecIdentifier] field 212 of a playlist file of the existing management information (existing database) previously described with reference to (b) in FIG. 4, [M2TS] indicating MPEG2-TS is fixedly recorded. This is because a settable data format in the stream directory beneath the BMD directory is MPEG2-TS alone.

On the other hand, with the media file identifier [MediaFileIdentifier] field 262 of a playlist file of the extended management information (extended database) described with reference to FIG. 5 through FIG. 7, not only [M2TS] but also various types of file identification information may be recorded. For example, in the event of a playlist conforming to MPEG4 to be set to the video directory [VIDEO] 130 shown in FIG. 2, [ISOBMFF] or [MP4] is recorded.

In this way, a playlist to be set to the extended management information (extended database) may be a playlist that can be used for not only MPEG2-TS but also various data formats.

An information processing device which performs data recording processing in accordance with the present invention generates, at the time of data recording processing as to a medium, a data file such as a stream file including data to be played, and also generates a playlist file including recorded data described with reference to FIG. 5 through FIG. 7 as a portion of a management information file including the management information of the data file. Specifically, a data processing unit of the information processing device records an URI (Uniform Resource Identifier) that is the file identification information of either the data file or a clip information file corresponding to the data file is recorded in a playlist, and further performs processing for recording the data format information of data to be played.

Also, the data processing unit of the information processing device which performs data playback processing from a medium reads out a playlist from the medium, and obtains an URI as to either file of a data file in which data to be played is stored from the playlist, or a clip information file, and performs obtaining processing of the data file or clip information file by applying the URI. Further, the data processing unit obtains the data format information of the data to be played from the playlist, and executes data decoding processing according to the obtained data format information to generate data to be played.

4. Data Playback Processing from Media and Data Recording Processing as to Media Next, description will be made regarding data playback processing from a medium such as a disc in which data recording has been performed in accordance with data management configuration described with reference to FIG. 2, i.e., directory configuration, and data recording processing sequence as to a medium.

Note that in the event that the recording/playback device is the old-type device, i.e., a device which cannot interpret the extended management information (extended database) 120 shown in FIG. 2, when performing new data recording, the recording/playback device performs only processing as to the existing management information (existing database) 112. Accordingly, in the event that a device which first performed data recording as to a medium is the old-type device, the extended management information (extended database) 120 shown in FIG. 2 is not generated, and data is set to only the BDMV directory 111 and thereafter shown in FIG. 2.

Accordingly, processing by the old-type device which cannot interpret the extended management information (extended database) 120 shown in FIG. 2, and processing by the new-type device which can interpret the extended management information (extended database) 120 differ. Also, there may be a case where the extended management information (extended database) 120 shown in FIG. 2 has already been set to a recording medium, or has not already been set thereto, processing that the device executes differs according to such a medium state.

FIG. 8 illustrates a table where the processing modes of data playback processing according to device and medium states are summarized. As shown in FIG. 8, playback processing of data recorded in a medium becomes the following processing modes.

(1a) In the case that the old-type device which cannot interpret the extended management information (extended database) performs data playback from a medium in which an existing database alone has been set (1b) In the case that the old-type device which cannot interpret the extended management information (extended database) performs data playback from a medium in which an existing database and an extended database have been set In these cases, the old-type device can execute only playback processing employing the existing database of the BDMV directory. The old-type device performs playback processing employing the existing database of the BDMV directory set to the medium, i.e., the index file, movie object file, and a playlist.

The old-type device uses information recorded in a playlist within the existing database to read out a clip information file and a stream file in the same BDMV directory, and performs playback processing.

(2a) In the case that the new-type device which can interpret the extended management information (extended database) performs data playback from a medium in which an existing database alone has been set (2b) In the case that the new-type device which can interpret the extended management information (extended database) performs data playback from a medium in which an existing database and an extended database have been set, and in the event that the data to be played is data that can be played using the existing database (in the event of playing a stream file compatible with existing standard (BD standard/AVCHD standard)), and when selecting the existing database as an available database, for example, according to the user's specification In these cases, the new-type device executes playback processing using the existing database in the BDMV directory. That is to say, there is no need to use an extended database. With an extended device, if the user's selection is permitted, it can be verified how playback is performed at the extended device and a conventional device.

(2c) In the case that the new-type device which can interpret the extended management information (extended database) performs data playback from a medium in which an existing database and an extended database have been set, and in the event that the data to be played is not data that can be played using the existing database (in the event of playing a stream file incompatible with existing standard (BD standard/ AVCHD standard))

In this case, the new-type device executes playback processing using the extended database.

Further, in the event of performing playback processing using an extended database, the new-type device executes consistency verification between the registration information of an existing database and the registration information of the extended database, and consistency adjustment processing. Specifically, the new-type device verifies whether or not the registration information of existing databases have all been registered in the extended database, and in the event that there is unregistered registration information, executes extended database updating processing for registering the registration information thereof in the extended database. If this updating processing is performed before playback, playback may be performed using the extended database alone, and accordingly, there is no need to switch the existing database and the extended database after this updating processing, and burden of playback processing is reduced.

Note that the above-mentioned processing in (2b) is exceptional processing, and in the event of performing data playback from a medium in which an existing database and an extended database have been set, the above-mentioned processing in (2c) is basically performed. However, in the event that the user possessing the new-type device intends to test how the medium of the existing database+extended database is played at the old-type device, or particularly intends to test how to view at the old-type device, or the like, (2b) may be executed as exceptional operation.

The processing sequence in the event of performing playback processing of recorded data in a medium will be described with reference to the flowchart shown in FIG. 9. The processing shown in this flow is executed at the data processing unit of the recording/playback device. Note that this flowchart is shown as a flowchart including both processes of the new-type device and old-type device.

In step S101, the data processing unit of the recording/ playback device reads the recorded information of a medium mounted on the device, and determines whether or not an extended database has been recognized. In the event that the playback device is the old-type device, recognition of an extended database cannot be performed, and accordingly, this determination in step S101 becomes all No. Also, even if the playback device is the new-type device, in the event that no extended database has been generated in the medium, the determination in step S101 becomes No.

In the event that the determination in step S101 is No, the processing proceeds to step S103, the data processing unit executes playback processing using an existing database. Specifically, the data processing unit uses the index file, movie object file, and a playlist in an existing database, uses information recorded in the playlist within the existing database to read out a clip information file and a stream file of the BDMV directory, and performs playback processing.

In the event that the playback device is the new-type device, and an extended database has been generated in the medium, the determination in step S101 becomes Yes. In this case, the data processing unit executes the processing in step S102 and thereafter. That is to say, the processing in step S102 and thereafter is processing that is executed at the new-type device alone which can interpret extended databases.

In step S102, the data processing unit selects a database used for playback processing. With this selection processing, the new-type device which can interpret extended databases first selects an extended database. That is to say, the data processing unit selects an extended database on the premise of performing processing for including all of the registration information of extended databases in the extended database. Note that selection of a database used for playback processing may be set by the user. Alternatively, selection of a database may automatically be set according to the title specified by the user. In the event that an existing database has been taken as the available database, the processing proceeds to step S103, the data processing unit executes playback processing using the existing database.

In event that an extended database has been taken as the available database, the processing proceeds to step S104, the data processing unit executes database consistency verification processing regarding whether or not all of the registration information of existing databases are included in the extended database.

In the event that determination is not made in step S105 that all of the registration information of existing databases are included in the extended database (with consistency), the processing proceeds to step S106, and the data processing unit executes extended database updating processing (database consistency adjustment processing) for including all of the registered information of the existing databases in the extended database.

For example, in the event that data recording has been performed at the old-type device, the management information corresponding to the recorded data thereof is recorded in an existing database alone. In this case, playback of a stream file compatible with existing standard may not be performed from the extended database. In order to avoid such a situation, at the time of performing playback processing using an extended database at the new-type device, updating of the extended database is executed to perform database consistency adjustment for also recording information recorded in an existing database in the extended database. Note that in the event that the new-type device is a device only for playback, the new-type device executes database consistency adjustment to temporarily record the updated extended database in memory within the device. The new-type device then starts playback using the updated database on the memory within the device instead of the extended database on the medium.

In the event that determination is made in step S105 that there is consistency of the databases, or after the consistency adjustment processing is executed in step S106, the processing proceeds to step S107, where the data processing unit performs playback processing using the extended database. Specifically, the data processing unit uses the index file, movie object file, and playlist in the extended database to read out a clip information file or stream file, and performs playback processing.

Note that, with the playlist to be applied in this playback processing, as described with reference to FIG. 6, an URI that is the identification information of a clip information file or stream file is recorded as the media file [MediaFile] information. Also, the data format information of the data to be played, e.g., information such as M2TS, ISOBMFF, MP4, or the like is recorded as the media file identifier [MediaFileIdentifier] information.

In this way, with the information processing device according to an embodiment of the present invention, in the event of performing data playback processing from the medium, the data processing unit executes the following processing.

In the event that the data to be played is data compatible with a standard conforming to a predetermined stipulated data recording/playback format, the data processing unit applies the existing management information (existing database) only for data compatible with a standard to obtain a data file in which the data to be played is stored, and executes playback processing.

In the event that the data to be played is data incompatible with a standard not conforming to a predetermined stipulated data recording/playback format, the data processing unit applies the extended management information (extended database) to obtain a data file in which the data to be played is stored, and executes playback processing.

Also, as described in the processing in step S106, the data processing unit of the information processing device performs management information file updating processing for additionally recording the management information of data not included in the existing management information (existing database) but included in the extended management information (extended database) in the extended management information (extended database).

According to this processing, the extended management information (extended database) may be set as management information including accessible information of all of the data files in which data to be played is stored, recorded in the medium.

Further, in the event of performing playback processing to which the extended management information (extended database) has been applied, the data processing unit of the information processing device reads out a playlist included in the extended management information (extended database) from the medium. Further, the data processing unit obtains an URI as to either of a data file in which data to be played is stored or a clip information file from the playlist, and performs obtaining processing of the data file or clip information file using the URI. Further, the data processing unit obtains the data format information of the data to be played from the playlist, and executes data decoding processing according to the obtained data format information to generate data to be played.

Next, data recording processing as to a medium will be described.

With data recording processing as well, in the same way as with the data playback processing, different processing will be performed according to the type of a device for executing recording processing, and the data recording state of the medium. FIG. 10 shows a table where the processing modes of data recording processing according to the device and medium state are summarized. As shown in FIG. 10, the data recording processing as to the medium provides the following processing modes.

(1a) In the case that the old-type device which cannot interpret the extended management information (extended databases) performs data recording as to the medium in which an existing database alone has been set (1b) In the case that the old-type device which cannot interpret the extended management information (extended databases) performs data recording as to the medium in which an existing database and an extended database have been set In these cases, the old-type device executes recording processing using an existing database in the BDMV directory. The old-type device generates a stream file and a clip information file according to the recorded data, and performs updating of an existing database according to the recorded data, and specifically performs updating of the index file and movie object file, and generation of a playlist.

(2a) In the case that the new-type device which can interpret the extended management information (extended databases) performs data recording as to a medium in which an existing database alone has been set, and in the event that the recorded data is data compatible with a standard (BD Standard/AVCHD Standard)

In this case, the new-type device executes data recording processing using an existing database in the BDMV directory. That is to say, there is no need to newly generate an extended database.

(2b) In the case that the new-type device which can interpret the extended management information (extended databases) performs data recording as to a medium in which an existing database alone has been set, and in the event that the recorded data is data incompatible with a standard (BD Standard/AVCHD Standard)

In this case, the new-type device does not use an existing database, creates an extended database, and registers the management information of the recorded data in the created extended database.

Specifically, the new-type device generates a stream file and a clip information file according to the recorded data, and registers the management information as to the recorded data in the extended database, i.e., performs generation of an index file, a movie object file, and a playlist.

Further, the new-type device performs processing for adding the registration information of an existing database to the generated extended database, i.e., performs extended database updating processing for holding consistency between databases.

(2c) In the case that the new-type device which can interpret the extended management information (extended databases) performs data recording as to a medium in which an existing database and an extended database have been set, and in the event that the recorded data is data compatible with a standard (BD standard/AVCHD standard)

In this case, the new-type device executes data recording processing to which an existing database has been applied. Specifically, the new-type device generates a stream file and a clip information file according to the recorded data, and registers the management information as to the recorded data in the extended database.

Further, the new-type device performs processing for adding the registration information of the existing database to the extended database, i.e., performs extended database updating processing for holding consistency between the databases.

(2d) In the case that the new-type device which can interpret the extended management information (extended databases) performs data recording as to a medium in which an existing database and an extended database have been set, and in the event that the recorded data is data incompatible with a standard (BD standard/AVCHD standard)

In this case, the new-type device executes data recording processing to which an expanded database has been applied. Specifically, the new-type device generates a stream file and a clip information file according to the recorded data, and registers the management information as to the recorded data in the extended database.

Further, the new-type device performs processing for adding the registration information of the existing database to the extended database according to need, i.e., performs extended database updating processing for holding consistency between the databases.

Figure 11:
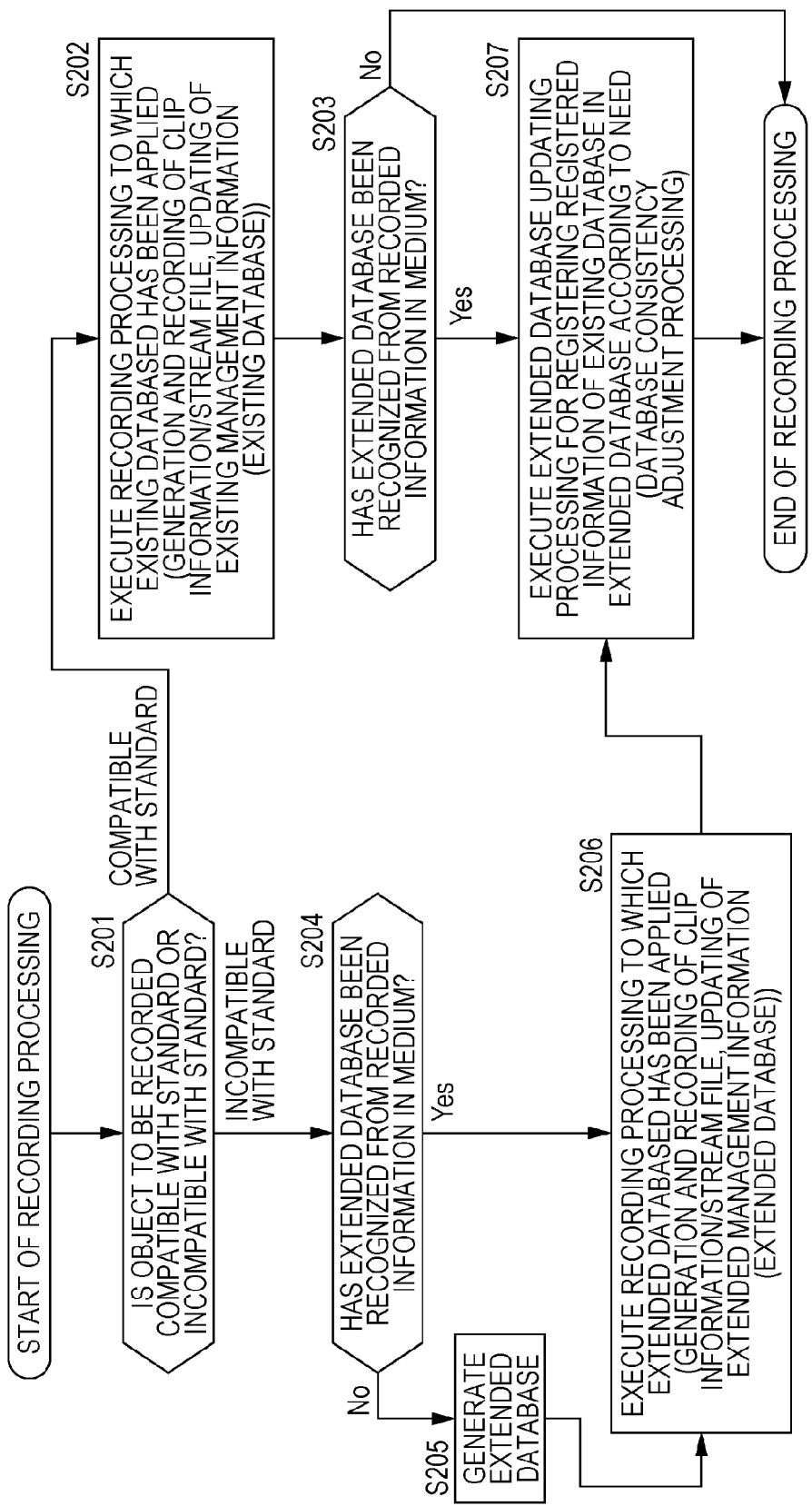
FIG. 11 is a diagram illustrating a flowchart for describing the sequence of the data recording processing that the information processing device according to an embodiment of the present invention executes.

The processing sequence in the event of performing data recording processing as to a medium will be described with reference to the flowchart shown in FIG. 11. The processing shown in this flow is executed by the data processing unit of the recording/playback device. Note that this flowchart is shown as a flowchart including both processes of the new-type device and old-type device.

In step S201, the data processing unit of the recording/playback device first determines whether the recorded data is data compatible with a standard (BD standard/AVCHD standard) or data incompatible with a standard. In the event that the recorded data is data compatible with a standard (BD standard/AVCHD standard), the existing database is selected as the available database, and in the event of data incompatible with a standard, the extended database is selected as the available database. Note that the device is the old-type device which cannot interpret the extended databases, the device may process only recording processing of data compatible with a standard. Also, the device is the new-type device which can interpret the extended databases, and in the event that the recorded data is data compatible with a standard (BD standard/AVCHD standard), selects the existing database as an available database, and in the event of data incompatible with a standard, selects the extended database as an available database.

In the event that the recorded data is data compatible with a standard (BD standard/AVCHD standard), use of the existing database is selected, and the processing proceeds to step S202. In step S202, data recording processing using the existing database is performed. That is to say, the data processing unit generates a stream file and a clip information file according to the recorded data, and performs updating of the existing database according to the recorded data, and specifically performs updating of the index file, and movie object file, and generation of a playlist.

Next, the processing proceeds to step S203. In step S203, determination is made whether or not an extended database has been recognized from the recorded information of the medium. In the event that the recording device is the old-type device, recognition of an extended database cannot be performed, and accordingly, this determination in step S203 becomes all No. Also, even if the recording device is the new-type device, in the event that no extended database has been generated in the medium, the determination in step S203 becomes No. In the event that the determination in step S203 is No, the data recording processing ends.

In the event that an extended database has been recognized from the recorded information of the medium in step S203, the processing proceeds to step S207. The processing in step S207 is processing that only the new-type device which can recognize extended databases executes. In step S207, database consistency adjustment for registering information registered in an existing database in the extended database is performed.

This consistency adjustment processing is performed so as to prevent a stream file compatible with existing standard from not being played from the extended database.

Next, description will be made regarding the case where determination is made in step S201 that the recorded data is data incompatible with a standard (BD standard/AVCHD standard). In this case, processing with the extended database being taken as an available database is performed, and the processing proceeds to step S204. Note that the processing in step S204 and thereafter is processing that only the new-type device which can recognize the extended databases executes.

In step S204, determination is made whether or not an extended database has been recognized from the recorded information of the medium. Even if the recording device is the new-type device, in the event that no extended database has been generated in the medium, the determination in step S204 becomes No. In the event that determination in step S204 is No, in step S205 generation processing of an extended database is performed.

In the event that an extended database has been recognized from the recorded information in the medium in step S204, and in the event that generation processing of an extended database has been performed in step S205, the processing proceeds to step S206.

In step S206, the data recording processing using an extended database is performed. That is to say, a stream file and a clip information file according to the recorded data are generated, and updating of the extended database is performed according to the recorded data, and specifically, updating of the index file and movie object file, and generation of a playlist are performed.

Note that, at the time of this data recording processing, the data processing unit of the information processing device generates a data file such as a stream file including the data to be played, and also generates a playlist file including the recorded data described with reference to FIG. 5 through FIG. 7 as a part of the management information files including the management information of this data file. Specifically, the data processing unit of the information processing device records an URI (Uniform Resource Identifier) that is the identification information of either the data file or a clip information file corresponding to the data file is recorded in the playlist, and further performs processing for recording the data format information of the data to be played.

Next, the processing proceeds to step S207. In step S207, database consistency adjustment (management information file updating processing) for registering information registered in the existing database in the extended database is also performed. Note that this processing does not have to be executed in the event that the registered information regarding all of the existing databases has been registered in the extended database (with consistency). This processing is executed only in the event that there is information registered in an existing database but not registered in the extended database (without consistency).

In this way, with the information processing device according to an embodiment of the present invention, in the event of performing data recording as to the medium, the data processing unit generates a data file such as a stream file including data to be played, or the like, and a clip information file, and generates or updates the management information file including the management information of the data file (e.g., index file, movie object file, and playlist file). Further, in the event that recorded data to be stored in a stream file is data compatible with a standard conforming to a predetermined stipulated data recording/playback format, the data processing unit records the management information of a stream file or the like in the existing management information (existing database) only for data compatible with a standard. Also, the stored data of a stream file is data incompatible with a standard not conforming to a predetermined stipulated data recording/playback format, the data processing unit performs processing for recording the management information of the stream file.

Also, as described in the processing in step S207, the data processing unit performs the management information file updating processing for additionally recording the management information of data included in the existing management information (existing database) but not included in the extended management information (extended database) in the extended management information (extended database).

According to this processing, the extended management information (extended database) may be set as management information including accessible information of all of the data files in which data to be played is stored, recorded in the medium.

5. Recorded Data Management Configuration Example Enabling Recording/Playback of Data Compatible with Standard and Data Incompatible with Standard Second Embodiment A directory configuration serving as recorded data management configuration enabling recording/playback of data compatible with a standard and data incompatible with a standard has been described with reference to FIG. 2 as the first embodiment, but the directory configuration is not restricted to the configuration shown in FIG. 2.

A second embodiment of the directory configuration will be described with reference to FIG. 12. The second embodiment is, as shown in FIG. 12, an example wherein the extended directory [HDEX] 121 described with reference to FIG. 2 is not set, and all of the management information and data are set to a BDMV directory 310 regardless whether compatible or incompatible with a standard (BD standard/AVCHD standard).

The management information of data compatible with existing standard (BD standard/AVCHD standard) is registered in existing management information (existing database) 320 made up of an index file [Index.bdmv] and a movie object file [MovieObject.bdmv].

Also, with an index file [Index2.bdmv] and a movie object file [MovieObject2.bdmv] making up extended management information (extended database) 330, all of the management information of data incompatible with existing standard (BD standard/AVCHD standard), and further the management information of data compatible with existing standard (BD standard/AVCHD standard) are registered.

Figure 12:
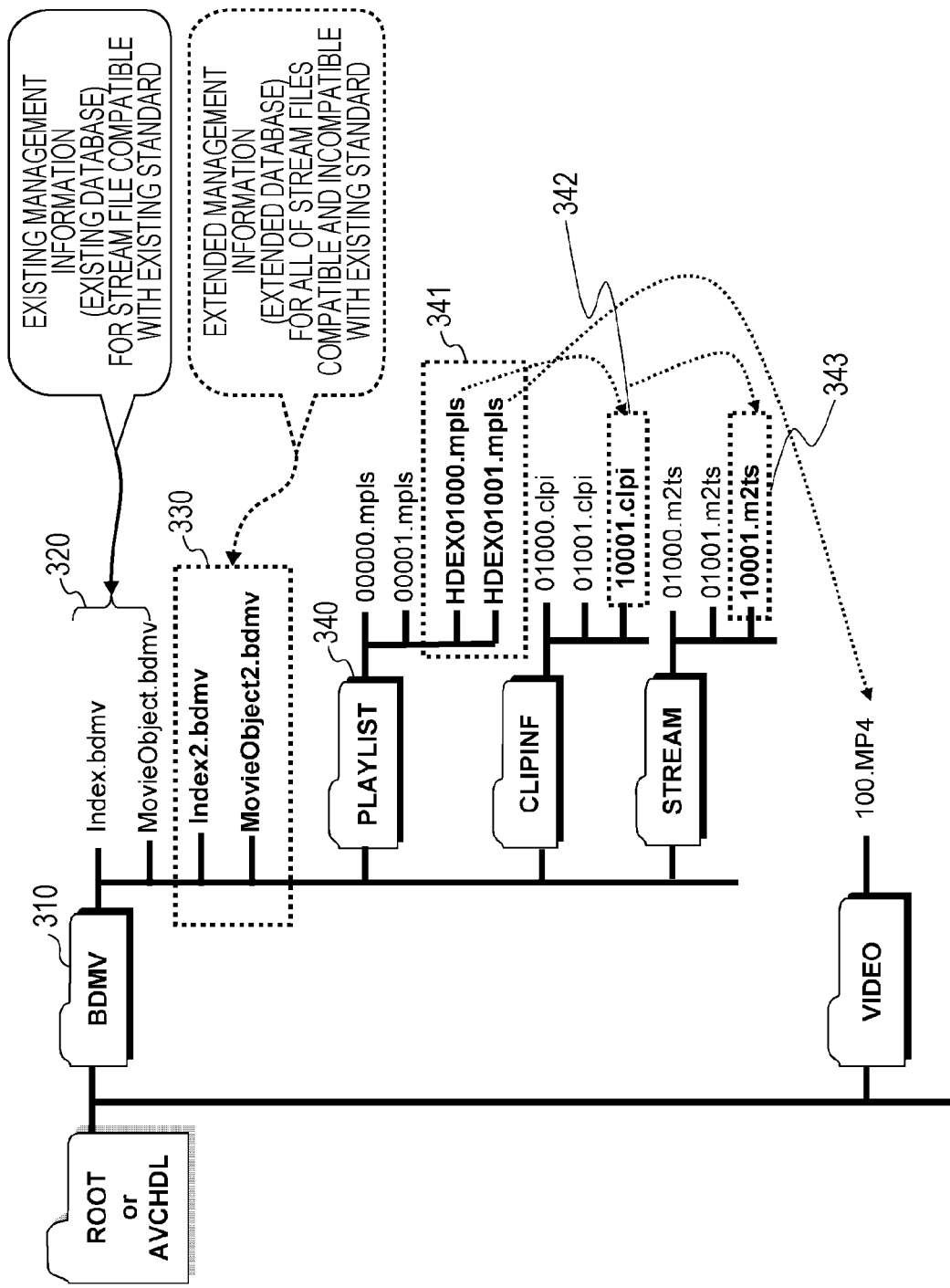
FIG. 12 is a diagram illustrating a directory configuration serving as the management configuration of recorded data of a medium according to an embodiment of the present invention.

Note that a title for calling a playlist file is set to the index files, with the index file [Index.bdmv] of the existing database set as the management information of data compatible with existing standard (BD standard/AVCHD standard), only two titles that can be played using two playlist files [00000.mpls] and [00001.mpls] of data compatible with existing standard shown in FIG. 12 are registered.

On the other hand, with the index file [Index2.bdmv] of the extended database, four titles that can be played using all of four playlists files of playlist files [00000.mps] and [00001.mps] of data compatible with existing standard, and playlist files [HDEX01000.mpls] and [HDEX01001.mpls] of data incompatible with existing standard shown in FIG. 12 are registered.

All of a playlist of data compatible with existing standard [BD standard/AVCHD standard], and a playlist of data incompatible with existing standard (BD standard/AVCHD standard) are set to a playlist directory 340. Playlists [HDEX01000.mpls] and [HDEX01001.mpls] shown as playlist files 341 are playlists corresponding to data incompatible with existing standard (BD standard/AVCHD standard), e.g., 4K×2K data, 1080/60p, 3D image data, or the like, and data incompatible with existing standard (BD standard/AVCHD standard).

Clip information files and stream files, in the same way as FIG. 2, are all set to one clip information directory and stream directory regardless of compatible with a standard or incompatible with a standard, and managed.

A stream file [10001.m2ts] 343 indicated with a dotted line frame shown in the drawing corresponds to data incompatible with a standard, and a clip information file as to this data is a clip information file [10001.clpi] 342.

With the playlist file [HDEX01000.mpls] of the playlist files 341, a clip information file [10001.clpi] is registered as a reference destination.

With the playlist file [HDEX01001.mpls] of the playlist files 341, data [100.MP4] of a video [VIDEO] directory is registered as a reference destination.

Note that, with the present embodiment as well, in the same way as with the previous first embodiment, the following data fields described with reference to (b) in FIG. 6 are set to the playlist files 341. Specifically, the following fields are set.

media file [MediaFile] field 261, and
media file identifier [MediaFileIdentifier] field 262

With the media file [MediaFile] field 261, the URI (Uniform Resource Identifier) of a clip information file or the like serving as a reference destination of a playlist is recorded.

With the media file identifier [MediaFileIdentifier] field 262, the data format information of a stream file to be played by a playlist is recorded.

Note that, with regard to the processing modes and processing sequence of the data recording/playback processing in the event of applying the directory configuration shown in FIG. 12, though the setting positions of the management information and generated files differ, other processing is generally the same processing as previously described with FIG. 8 through FIG. 11.

Note that, with the previous first embodiment, description has been made including the index file, movie object file, and playlist file, these three types of files as the management information (database), but with the example shown in FIG. 12, description will be made with the management information (database) as the index file and movie object file, these two types of files. The management information (database) is management information to be set corresponding to actual data to be recorded, and either a setting including playlists or a setting excluding playlists may be set.

Note that, with the example shown in FIG. 12, in the event that the management information (database) is defined as information including playlist files, playlist files included in existing management information (existing database) are only two of the playlist files [00000.mpls] and [00001.mpls] set in the playlist directory 340 shown in FIG. 12. On the other hand, all of the playlist files set to a playlist directory are included in the extended management information (extended database).

6. Configuration Example of Information Processing Device

Figure 13:
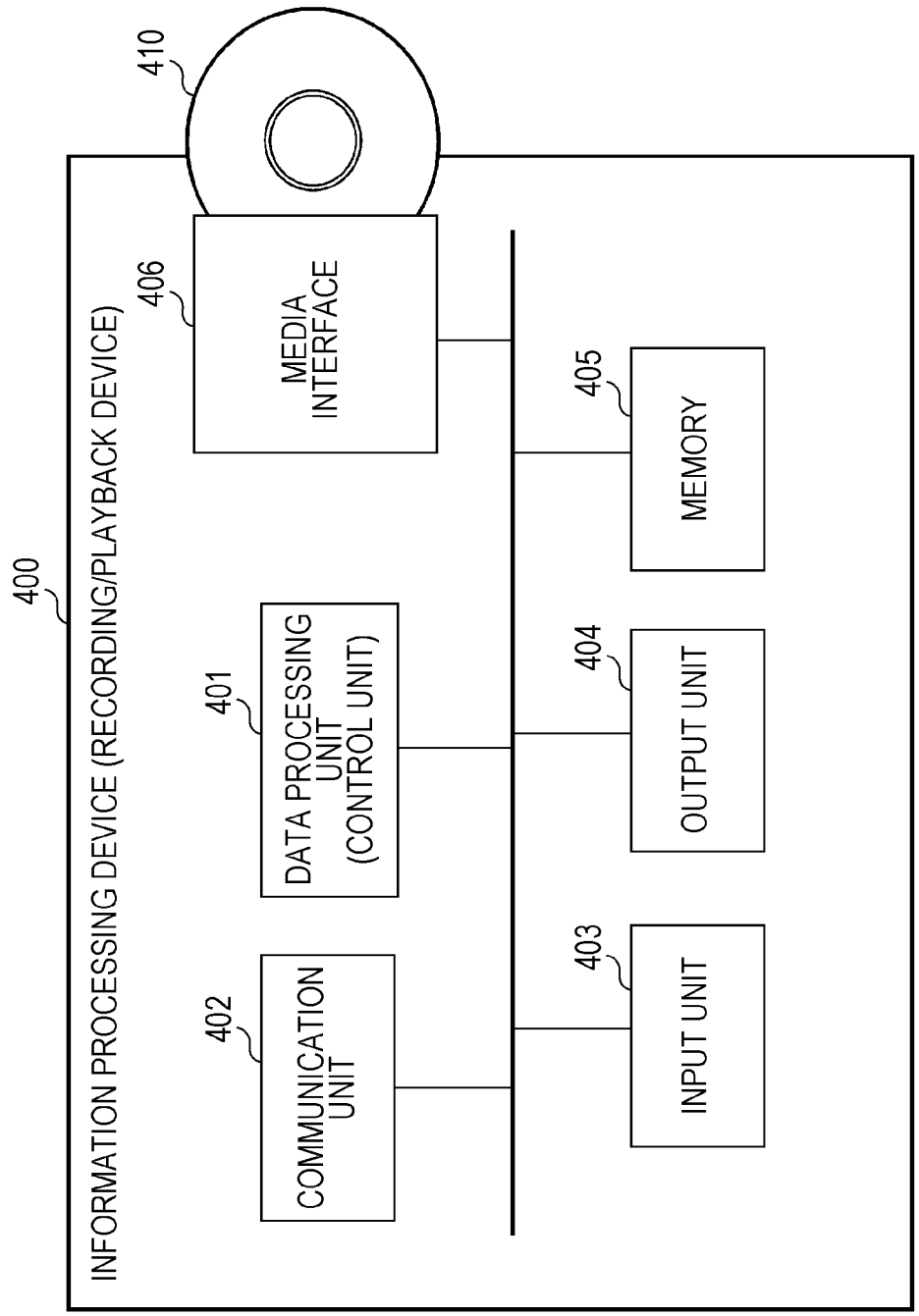
FIG. 13 is a diagram for describing the configuration of the information processing device according to an embodiment of the present invention.

Next, description will be made regarding a configuration example of the information processing device according to an embodiment of the present invention which executes data recording processing as to the above-mentioned medium, and data playback processing from the medium, with reference to FIG. 13. FIG. 13 is a block diagram illustrating a configuration example of an information processing device 400 according to an embodiment of the present invention. The information processing device 400 is a device which performs at least either data recording or data playback as to a medium 410. Specifically, examples of this include a recorder, a video camera, and a PC.

Note that FIG. 13 illustrates a disc-type medium as the medium 410, but the medium is not restricted to a disc-type medium, may be a medium such as flash memory or the like.

The information processing device 400 includes, as shown in FIG. 13, a data processing unit (control unit) 401, a communication unit 402, an input unit 403, an output unit 404, memory 405, and a media interface 406.

The data processing unit 401 includes a CPU having a program execution function for executing various data processing programs. The data processing unit 401 executes, for example, an application program for performing data recording/playback processing. The data processing unit 401 performs recording processing as to a medium such as broadcast data input via the communication unit 402, playback processing of data read out from a medium, or the like.

The input unit 403 is, for example, a user's operating unit to which various types of input are performed such as input of data recording or playback instruction or the like. Note that a remote controller is also included in the input unit 403, whereby input of remote controller operation information can also be performed. The output unit 404 is an output unit for images and audio made up of a display, a speaker, and so forth. The memory 405 is made up of RAM, ROM, and so forth, and is used as a storage region for an application program that the data processing unit 401 executes, and so forth. The memory 405 is also used for parameters for application, and a work region, and further used for a buffer region of medium recorded data, and so forth.

The media interface 406 is an interface to be applied to data recording and playback processing using the medium 410. In accordance with a request from the data processing unit 401, the media interface 406 writes data in the medium 410, or data readout processing from the medium 410, and so forth.

Data recording/playback processing that is executed at the data processing unit 401 is processing previously described with reference to the flowchart, for example. A program for executing such processing is stored in the memory 405.

Detailed description has been made so far regarding the present invention while referencing particular embodiments. However, it is self-evident that one skilled in the art can perform various modifications and changes without departing from the essence of the present invention. That is to say, the present invention has been disclosed exemplarity, and the description content of the present specification is not to be interpreted in a limited manner. The claims should be referred to in order to determine the essence of the present invention.

Note that incompatible with a standard described with the above-mentioned embodiments means incompatible with an existing conventional standard, and for example, in the event that a standard is upgraded in the future, s predetermined extended stream may become "compatible with a standard", but in such a case, the extended stream thereof is a stream incompatible with the standard as far as this extended stream is incompatible with the standard of the former version.

The series of processing described in the present Specification may be executed by hardware or software or a combined configuration of both. In the event of executing processing by software, a program in which the processing sequence is recorded may be executed by being installed in memory within a computer built into in dedicated hardware, or may be executed by being installed in a general-purpose computer which can execute various types of processing. For example, the program may be recorded in a recording medium beforehand. In addition to installing in the computer from a recording medium, the program may be received via a network such as a LAN (Local Area Network) or the Internet, and installed in a recording medium such as a built-in hard disk or the like.

Note that various types of processing described in the present Specification may be executed not only in time sequence in accordance with the described sequence but also in parallel or individually according to the processing capability of a device which executes the processing or according to need. Also, with the present Specification, the term system means a logical group configuration of multiple devices, and is not restricted to a configuration in which component devices are included in the same casing.

INDUSTRIAL APPLICABILITY

As described above, according to the configuration of an embodiment of the present invention, at the time of data recording processing as to a medium, in the event that recorded data is data compatible with a standard such as the BD standard or AVCHD standard or the like, the management information of the data is recorded in a first management information file only for data compatible with a standard, and in the event of data incompatible with a standard, the management information of the data is recorded in a second management information file. Also, management information updating processing for recording all of the management information recorded in the first management information file in the second management information file is performed. An existing device which executes only processing as to data compatible with a standard performs processing by applying the first management information, and the new-type device which can execute processing as to data incompatible with a standard may perform playback of all of the data by processing to which the second management information has been applied.

REFERENCE SIGNS LIST

111 BDMV directory
112 existing management information (existing database)
113 stream file
114 clip information file
120 extended management information (extended database)
121 extended directory (HDEX directory)
122 playlist directory
130 video directory
310 BDMV directory
320 existing management information (existing database)
330 extended management information (extended database)
340 playlist directory
341 playlist file
342 clip information file
343 stream file
400 information processing device
401 data processing unit
402 communication unit
403 input unit
404 output unit
405 memory
406 media interface
410 medium

The invention claimed is:
1. An information processing device comprising:
a data processing unit configured to:
generate or update a data file including data for playback, and a management information file including management information of said data file at a time of recording said data to a medium;
record said management information of said data file in a first management information file only when said data is compatible with a standard conforming to a predetermined stipulated data recording/playback format; and record said management information of said data file in a second management information file different from said first management information file only when said data is incompatible with said standard conforming to said predetermined stipulated data recording/playback format, wherein said standard is either a Blu-ray Disc (BD) standard or an Advanced Video Codec High Definition (AVCHD) standard, wherein said data processing unit is configured to set a first directory, corresponding to said first management information file, including an index file and a movie object file which apply to only said data compatible with said standard and to set a second directory, corresponding to said second management information file, including an index file and a movie object file which apply to said data incompatible with said standard and said data compatible with said standard.

2. The information processing device according to claim 1, wherein said data processing unit is configured to update said second management information file with said management information of said data file included in said first management information file but not included in said second management information file.

3. The information processing device according to claim 2, wherein said data processing unit is configured to set said second management information file to include information to access all data files recorded in said medium.

4. An information processing device comprising:
a data processing unit configured to perform generation or updating processing of a data file including data for playback, and a management information file including management information of said data file at a time of data recording processing as to a medium,
wherein said data processing unit is configured to perform processing to record said management information of said data file in a first management information file only for said data compatible with a standard in an event that said recorded data to be stored in said data file is said data compatible with a standard conforming to a predetermined stipulated data recording/playback format, and to record said management information of said data file in a second management information file different from said first management information file in an event that said stored data of said data file is said data incompatible with said standard conforming to said predetermined stipulated data recording/playback format, wherein said standard of said predetermined data recording/playback format is either a Blu-ray Disc (BD) standard or an Advanced Video Codec High Definition (AVCHD) standard, wherein said data processing unit is configured to set said first management information file as a file including an index file, a movie object file, and a playlist file which are applied to only said data compatible with said standard conforming to said BD standard or said AVCHD standard, and set said second management information file as a file including an index file, a movie object file, and a playlist file which are applied to said data incompatible with said standard conforming to said BD standard or said AVCHD standard, and said data compatible with said standard conforming to said BD standard or said AVCHD standard.

5. The information processing device according to claim 4, wherein said data processing unit is configured to perform recorded data management according to a directory configuration where a directory that is a management configuration of said data recorded in a medium is set in a first directory for setting said first management information file and a second directory for setting said second management information file as separate individual directories.

6. The information processing device according to claim 4, wherein said data processing unit is configured to perform playlist setting processing for enabling said data compatible with said standard conforming to said BD standard or said AVCHD standard to be executed even if either said playlist file included in said first management information file or said playlist file included in said second management information file is applied.

* * * * *